United States Patent
Revell et al.

(10) Patent No.: US 10,303,943 B2
(45) Date of Patent: May 28, 2019

(54) CLOUD FEATURE DETECTION

(71) Applicant: BAE Systems plc, London (GB)

(72) Inventors: James Duncan Revell, Bristol (GB); Roderick Buchanan, Warton (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 15/543,247

(22) PCT Filed: Jan. 20, 2015

(86) PCT No.: PCT/GB2015/050124
§ 371 (c)(1),
(2) Date: Jul. 13, 2017

(87) PCT Pub. No.: WO2016/116725
PCT Pub. Date: Jul. 28, 2016

(65) Prior Publication Data
US 2017/0372120 A1    Dec. 28, 2017

(51) Int. Cl.
*G06K 9/00* (2006.01)
*G06K 9/46* (2006.01)
(Continued)

(52) U.S. Cl.
CPC .......... *G06K 9/0063* (2013.01); *B64C 39/024* (2013.01); *B64D 43/00* (2013.01);
(Continued)

(58) Field of Classification Search
CPC . G06T 2207/30192; G06T 2207/30252; G06T 7/33; G06T 2207/30241; G06K 9/0063; G06K 9/00805; G06K 9/6267
See application file for complete search history.

(56) References Cited

U.S. PATENT DOCUMENTS 5,612,901 A * 3/1997 Gallegos .............. G06K 9/0063
                                                            348/144
5,751,843 A    5/1998 Maggioni et al.
(Continued)

FOREIGN PATENT DOCUMENTS

CN       103500449 A    1/2014
EP         2731050 A1    5/2014
(Continued)

OTHER PUBLICATIONS

Li et al., A Hybrid Thresholding Algorithm for Cloud Detection on Ground-Based Color Images, 2011, Journal of Atmospheric and Oceanic Technology, vol. 28, pp. 1286-1296.*
(Continued)

*Primary Examiner* — Vu Le
*Assistant Examiner* — Guillermo M Rivera-Martinez
(74) *Attorney, Agent, or Firm* — Maine Cernota & Rardin (57) ABSTRACT

Disclosed is a method and apparatus for detecting cloud features. The method comprises: obtaining image data (e.g. using a camera), the image data defining a plurality of pixels and, for each pixel, a respective luminance value; defining one or more intervals for the luminance values of the pixels; partitioning the image data into one or more image segments (502-508), each respective image segment (502-508) containing pixels having a luminance value in a respective interval; and classifying, as a cloud feature, each image segment (502-508) containing pixels having luminance value greater than or equal to a threshold luminance value ($L_T$).

13 Claims, 5 Drawing Sheets

(51) Int. Cl.

| | |
|---|---|
| *G06T 7/11* | (2017.01) |
| *B64C 39/02* | (2006.01) |
| *B64D 43/00* | (2006.01) |
| *B64D 47/08* | (2006.01) |
| *G05D 1/00* | (2006.01) |
| *G06K 9/62* | (2006.01) |
| *G08G 5/00* | (2006.01) |

(52) U.S. Cl.
CPC .......... *B64D 47/08* (2013.01); *G05D 1/0088* (2013.01); *G06K 9/4652* (2013.01); *G06K 9/4661* (2013.01); *G06K 9/6267* (2013.01); *G06T 7/11* (2017.01); *B64C 2201/141* (2013.01); *G08G 5/0052* (2013.01)

(56) References Cited

U.S. PATENT DOCUMENTS

| | | | | |
|---|---|---|---|---|
| 6,512,846 | B1* | 1/2003 | Luo | G06K 9/00664 |
| | | | | 382/164 |
| 9,070,285 | B1* | 6/2015 | Ramu | G05D 1/0044 |
| 2002/0096622 | A1* | 7/2002 | Adler-Golden | G06K 9/0063 |
| | | | | 250/208.1 |
| 2003/0053686 | A1* | 3/2003 | Luo | G06K 9/38 |
| | | | | 382/165 |
| 2009/0097713 | A1* | 4/2009 | DeLean | G06F 21/32 |
| | | | | 382/115 |
| 2013/0135470 | A1* | 5/2013 | Prata | G01S 3/781 |
| | | | | 348/144 |
| 2013/0258068 | A1* | 10/2013 | Schmidt | H04N 7/18 |
| | | | | 348/49 |
| 2014/0029844 | A1* | 1/2014 | Padwick | G06K 9/4652 |
| | | | | 382/165 |
| 2014/0212061 | A1* | 7/2014 | Miller | G01W 1/18 |
| | | | | 382/260 |
| 2015/0010200 | A1* | 1/2015 | Kawahara | G01W 1/02 |
| | | | | 382/100 |
| 2016/0283774 | A1 | 9/2016 | Buchanan | |
| 2017/0372120 | A1 | 12/2017 | Revell | |
| 2018/0005012 | A1* | 1/2018 | Aycock | G02B 5/201 |

FOREIGN PATENT DOCUMENTS

| | | |
|---|---|---|
| GB | 2507314 A | 4/2014 |
| KR | 20130027356 | 3/2013 |
| WO | 2003069558 A1 | 8/2003 |
| WO | 2006024974 A1 | 3/2006 |
| WO | 2006129218 A1 | 7/2006 |
| WO | 2014072737 A1 | 5/2014 |

OTHER PUBLICATIONS

M. P. Souza-Echer et al, "A Simple Method for the Assessment of the Cloud Cover State in High-Latitude Regions by a Ground-Based Digital Camera", Journal of Atmospheric and Oceanic Technology, vol. 23, No. 3, Mar. 2006 (Mar. 2006), pp. 437-447, 11 pages.
Dahlkamp, Hendrik, "Self-supervised Monocular Road Detection in Desert Terrain", http://robots.stanford.edu/papers/dahlkamp.adaptvision06.pdf, 7 pages.
"Due Regard Capability for Unmanned Aircraft Systems Based on Intelligent Cloud Detection and Avoidance", Air Force SBIR/STTR Innovation Stories, Jun. 24, 2012 (Jun. 24, 2012), XP055061016, etrieved from the Internet: URL:http://www.afsbirsttr.com/Publications/SBIRImpactStory.aspx [retrieved on Apr. 24, 2013], 3 pages.
Hieu Nguyen; Joseph Yadegar; Jim Utt; Bonnie Schwartz,"EO/IR Due Regard Capability for UAS Based on Intelligent Cloud Detection and Avoidance", Apr. 20, 2010-Apr. 22, 2010, AIAA Infotech@Aerospace 2010, Atlanta, Georgia, http://arc.aiaa.orgidoilabs/10.2514/6.2010-3338, 11 pages.
Chaitanya Raju, Sakina Zabuawala, Sreekar Krishna, Joseph Yadegar, "A Hybrid System for Information Fusion with Application to Passive Ranging", UtopiaCompression Corporation, Submitted to IPCV'07—The 2007 International Conference on Image Processing, Computer Vision, and Pattern Recognition, 8 pages.
"Staffan Rydergard, ""Obstacle Detection in a See-and-Avoid System for Unmanned AerialVehicles""", Master's Thesis in Computer Science at the School of Vehicle Engineering, Royal Institute of Technology, 2004, Stockholm, Sweden, Retrieved from the Internet:URL:http://www.nada.kth.se/utbildning/grukth/exjobb/rapportlistor/2004/rapporter04/rydergard_staffan_04013.pdf, [retrieved on Apr. 25, 2013], 71 pages".
De Croon, G C H E; De Wagter C; Remes, B D W; Ruijsink, R; "Sky Segmentation Approach to obstacle avoidance",2011 IEEE Aerospace Conference, May 3, 2011, pp. 1-16, 16 pages.
Herbert Bay, Tinne Tuytelaars, and Luc Van Gool, "SURF: Speeded Up Robust Features", Katholieke Universiteit Leuven, 14 pages.
Charles Patchett et al, "The Development of an Advanced Autonomous Integrated Mission System for Uninhabited Air Systems to Meet UK Airspace Requirements", Intelligent Systems. Modelling and Simulation (ISMS), 2010 International Conference on, IEEE, Piscataway, NJ, USA, Jan. 27, 2010 (Jan. 27, 2010), pp. 60-64, 5 pages.
Rob Whitehouse, "Unlocking the civil UAV market", Aerospace International, Sep. 2010 (Sep. 2010), pp. 26-28, London, Retrieved from the Internet: URL:http://www.roke.co.uk/resources/articles/Unlocking-the-Civil-UAV-Market.pdf [retrieved on May 7, 2013], 3 pages.
EP Search Report dated May 16, 2013 of EP Patent Application No. 122751.2 filed Nov. 12, 2012, 8 pages.
GB Search Report dated May 10, 2013 of GB Patent Application 1220316.2 filed Nov. 12, 2012, 3 pages.
McKenna, Stephen J.—Tracking colour objects using adaptive mixture models, Image and Vision Computing vol. 17, 1999, pp. 225-231, Elsevier Science B.V., PII: S0262-8856(98)00104-8.
Barniv, Yair—"Passive Ranging Using Image Expansion", IEEE Transactions on Aerospace and Electronic Systems vol. 31, No. 1, Jan. 1995; pp. 358-374.
J. Sola, A. Monin, M. Devy & T. Lemaire, "Undelayed Initialization in Bearing Only SLAM", In Proc. International Conference on Itelligent Robots and Systems, 2005.
Sonka, Image Processing, Analysis and Machine Vision, (Brooks/Cole 2007) p. 16.
J. Shi & C. Tomasi, "Good Features to Track", IEEE Conf. Computer Vision and Pattern Recognition, 1994, pp. 593-600.
S. Avidan & A. Shashua, 'Trajectory Triangulation of Lines: Reconstruction of a 3D Point Moving Along a line from a Monocular Image Sequence', IEE Transactions on Pattern Analysis and Machine Intelligence, vol. 22, No. 4, Apr. 2000, pp. 348-357.
Search Report under Section 17(5) of Great Britain Application No. GB1500933.5, dated Jun. 23, 2015, 3 pages.
Search Report under Section 17(5) of Great Britain Application No. GB1500932.7, dated Jun. 29, 2015, 3 pages.
International Search Report and Written Opinion of International Application No. PCT/GB2015/050123, dated Jul. 17, 2015, 11 pages.
Lee R et al: "Moment Preserving Detection of Elliptical Shapes in Gray-Scale Images", Pattern Recognition Letters, Elsevier, Amsterdam, NL, vol. 11, No. 6, Jun. 1, 1990, pp. 405-414, XP000128317.
International Preliminary Report on Patentability and Written Opinion for Appl No. PCT/GB2015/050124 dated Jul. 25, 2017, 7 pages.
Liu et al; Cloud Classification Based on Structure Features of Infrared Images; Journal of Atmospheric and Oceanic Technology; vol. 28, Mar. 2001; 8 pages.
Gardner, Geoffrey Y.; Visual Simulation of Clouds; Proceedings of SIGGRAPH 1985, Comput. Graph., 19 (3) (1985), pp. 297-304.
Fernandes, Armando Manuel; Study on the Automatic Recognition of Oceanic Eddies in Satellite Images by Ellipse Center Detection—The Iberian Coast Case; IEEE Transactions on Geoscience and Remote Sensing, vol. 47; No. 8, Aug. 2009, 14 pages.

\* cited by examiner

CLOUD FEATURE DETECTION

RELATED APPLICATIONS

This application is a National Phase application filed under 35 USC § 371 of PCT Application No. PCT/GB2015/050124 with an International filing date of Jan. 20, 2015. This application is herein incorporated by reference in its entirety for all purposes.

FIELD OF THE INVENTION

The present invention relates to the detection of cloud features.

BACKGROUND

In situations such as autonomous control of aircraft it can be desirable to automatically detect cloud features without relying on human vision/input. A system that detects cloud features can be combined with a route planner or the like to help an aircraft avoid bad weather or other crafts/objects that may not be visible through clouds. Further, obtaining range information relating to cloud features is complicated due to cloud motion and the typically small triangulation baseline.

SUMMARY OF THE INVENTION

In a first aspect, the present invention provides a method of detecting cloud features. The method comprises: obtaining image data, the image data defining a plurality of pixels and, for each pixel, a respective luminance value; defining one or more intervals for the luminance values of the pixels; partitioning the image data into one or more image segments, each respective image segment containing pixels having a luminance value in a respective interval; and classifying, as a cloud feature, each image segment containing pixels having luminance value greater than or equal to a threshold luminance value.

Obtaining the image data may comprise capturing, using one or more cameras, an image. The method may further comprise measuring a time of day at which the camera captured the image, and determining the threshold luminance value using the measured time of day. The method may further comprise measuring an orientation of the camera when the image was captured, and determining the threshold luminance value using the measured orientation.

The step of obtaining image data may comprise converting image data into a hue-saturation-luminance coordinate system.

The method may further comprise classifying, as an entity other than a cloud feature, each image segment containing pixels having luminance values less than the threshold luminance value.

The step of defining one or more intervals for the luminance values of the pixels may comprise: determining a maximum of the luminance values of the pixels; obtaining the threshold luminance value, the threshold luminance value being less than the maximum of the luminance values; and defining one or more intervals between the maximum of the luminance values and the threshold luminance value.

A size or sizes of the one or more intervals may be determined using one or more measurements selected from the group of measurements consisting of: a time of day measurement, an orientation measurement, and a measurement of available computational resource.

The step of classifying may comprise, for a first image segment classified as a cloud feature, assigning a first set of classification labels, the first image segment containing pixels having luminance values in a first interval. The step of classifying may comprise, for a second image segment classified as a cloud feature, assigning a second set of classification labels, the second image segment containing pixels having luminance values in a second interval, the second interval being different to the first interval, the second set of classification labels being different to the first set of classification labels.

The first set of classification labels may include a label indicating a first type of cloud. The second set of classification labels may include a label indicating a second type of cloud, the second type of cloud being different to the first type of cloud.

The method may further comprise, for an image segment classified as a cloud feature: determining a plurality of moments of that image segment; using the determined plurality of moments, determining a geometric representation of that image segment; and, using the geometric representation of that image segment, determining a distance between the cloud feature represented by that image segment and an entity that obtained the image data.

Obtaining the image data may comprise capturing, using one or more cameras, an image. The camera may be mounted on an aircraft. The method may further comprise, controlling the aircraft based on the detected cloud features.

In a further aspect, the present invention provides apparatus for detecting cloud features, the apparatus comprising: one or more sensors configured to obtain image data, the image data defining a plurality of pixels and, for each pixel, a respective luminance value; and one or more processors configured to: define one or more intervals for the luminance values of the pixels; partition the image data into one or more image segments, each respective image segment containing pixels having a luminance value in a respective interval; and classify, as a cloud feature, each image segment containing pixels having luminance value greater than or equal to a threshold luminance value.

In a further aspect, the present invention provides an aircraft comprising apparatus according to the preceding aspect.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

DETAILED DESCRIPTION

Figure 1:
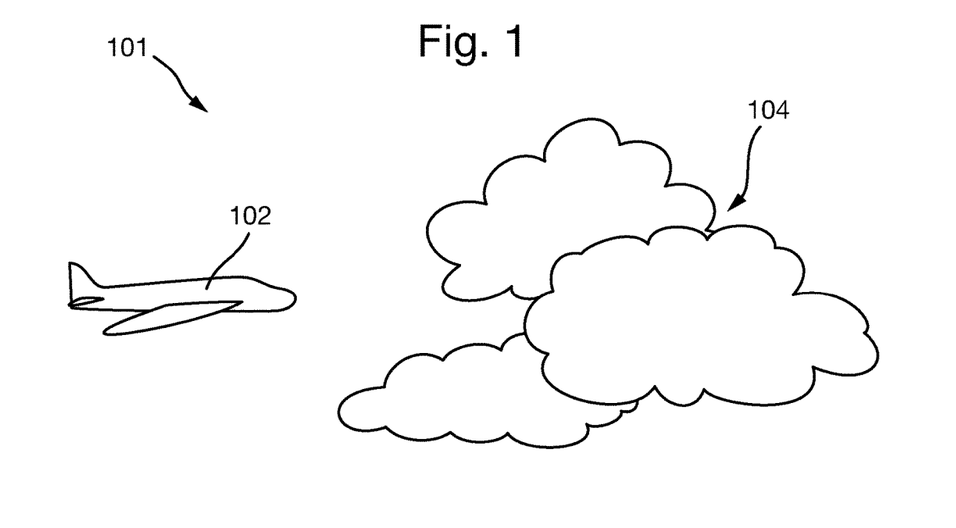
FIG. 1 is a schematic illustration (not to scale) of a scenario 101 in which an aircraft is flying in the vicinity of a cloud formation.

FIG. 1 is a schematic illustration (not to scale) of a scenario 101 in which an aircraft 102 is flying in the vicinity of a cloud formation 104.

The aircraft 102 is an unmanned autonomous aircraft. The aircraft 102 implements a cloud detection and ranging process to facilitate navigation with respect to the cloud formation 104. An embodiment of a cloud detection and ranging process is described in more detail later below with reference to FIGS. 3 to 8.

Figure 2:
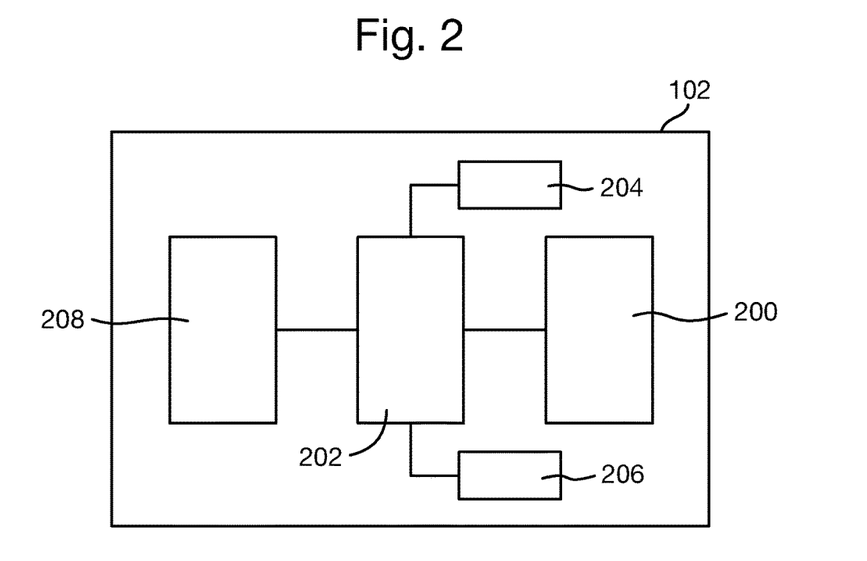
FIG. 2 is a schematic illustration (not to scale) showing further details of the aircraft.

FIG. 2 is a schematic illustration (not to scale) showing further details of the aircraft 102.

In this embodiment, the aircraft 102 comprises a visible light detecting camera 200, a processor 202, a clock 204, an inertial measurement unit (IMU) 206, and a controller 208.

The camera 200 is a video camera capable of producing a sequence of image-based data in a suitable manner and data format. The camera 200 is configured to capture images of a scene external to the aircraft 102. In this embodiment, the camera 200 is configured to capture image in front of the aircraft 102, in the direction of travel of the aircraft 102. The camera 200 is coupled to the processor 202 such that images captured by the camera 200 may be sent from the camera 200 to the processor 202.

The clock 204 is configured to measure the time-of-day local to the aircraft 102. The clock 204 may automatically update with respect to, for example, local time zones in which the aircraft 102 is operating. This updating of the clock 204 may be performed, for example, using GPS measurements of the aircraft 102. The clock 204 is coupled to the processor 202 such that time-of-day measurements taken by the clock 204 may be sent from the clock 204 to the processor 202.

The IMU 206 is an electronic device configured to measure the position, orientation, and velocity of the aircraft 102. In this embodiment, the position of the aircraft 102 is a global positioning system (GPS) measurement of the aircraft's location. The IMU 206 is coupled to the processor 202 such that measurements of the aircraft's position, orientation, and velocity taken by the IMU 206 may be sent from the IMU 206 to the processor 202.

The processor 202 is configured to receive and process measurements received from the camera 200, the clock 204 and the IMU 206, as described in more detail later below with reference to FIGS. 3 to 8. An output of the processor 202 is a control signal for controlling operation of the aircraft 102. The processor 202 is coupled to the controller 208 such that the control signal determined by the processor 202 may be sent from the processor 202 to the controller 208.

The controller 208 is configured to control the aircraft 102 in accordance with the control signal received from the processor 202.

Figure 3:
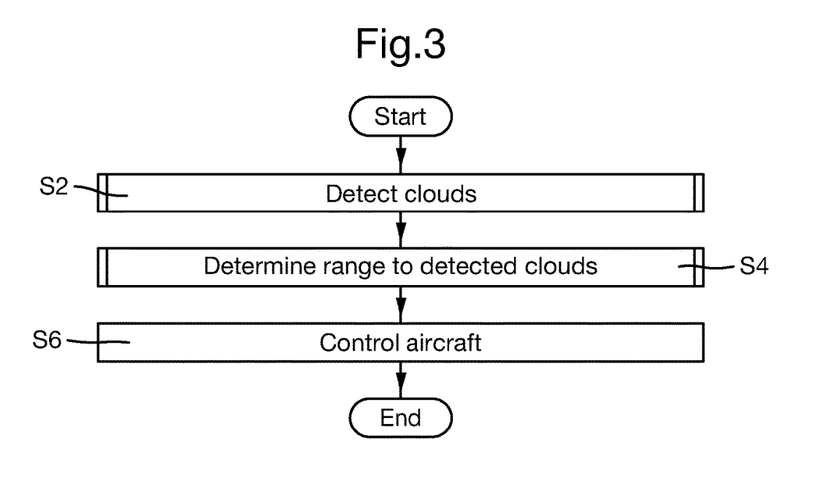
FIG. 3 is a process flow chart showing certain steps of a process of controlling the aircraft.

FIG. 3 is a process flow chart showing certain steps of a process of controlling the aircraft 102 in which an embodiment of the cloud detection and ranging process is implemented.

At step s2, a process of detecting clouds is performed. The cloud detection process is described in more detail later below with reference to FIG. 4.

At step s4, respective ranges between the aircraft 102 and the clouds detected at step s2 are determined. The cloud ranging process is described in more detail later below with reference to FIG. 6.

At step s6, using the output from the cloud detection process and the cloud ranging process performed at step s2 and s4 respectively, the processor 202 determines a control signal for controlling the aircraft 102, and sends the determined control signal to the controller 208. The controller 208 controls the aircraft 102 in accordance with the received control signal, for example so as to avoid the clouds of the cloud formation 104.

Figure 4:
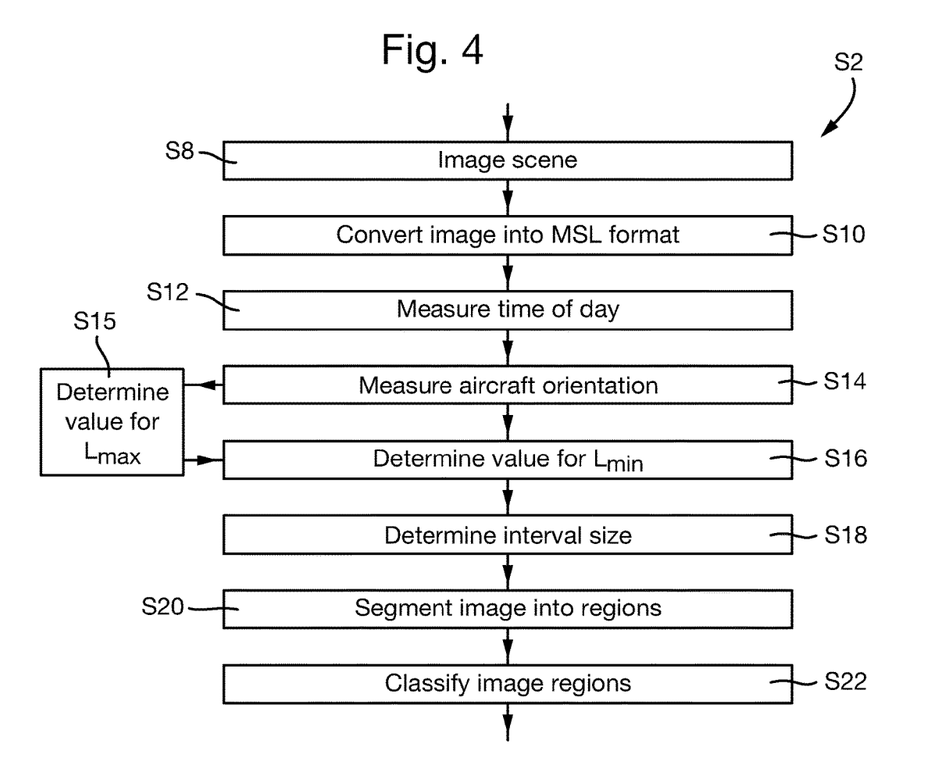
FIG. 4 is a process flow chart showing certain steps of a cloud detection process.

Returning to the description of step s2, FIG. 4 is a process flow chart showing certain steps of an embodiment of the cloud detection process. Although the cloud detection process of FIG. 4 is described below as being performed based on a single image captured by the camera 200, it will be appreciated by the skilled person that, in practice, the camera 200 captures a video or image sequence and that the process of FIG. 4 may be continuously performed or updated as new images are captured.

At step s8, the camera 200 captures an image of a scene in front of the aircraft 102. In particular, the camera 200 captures an image along a direction of travel of the aircraft 102. The camera 200 captures an image of the cloud formation 104.

In this embodiment, the image captured by the camera 200 is in a red-green-blue (RGB) format, i.e. each pixel in an image is assigned a coordinate [R, G, B] representative of its colour in the RGB colour space.

The camera 200 sends the captured image of the scene to the processor 202. In some embodiments, the camera 200 acquires and sends 5 megapixel images to the processor 202 at a rate of 15 Hz.

At step s10, the processor 202 converts the received image into the hue-saturation-luminance (or hue-saturation-lightness) (HSL) coordinate system. The HSL coordinate system is a cylindrical coordinate representation of the RGB colour space. Any appropriate process may be used by the processor 202 to convert the received image from the RGB coordinate system into the HSL coordinate system.

After conversion into the HSL format, each pixel in the captured image is assigned a coordinate [H, S, L] in the HSL space.

At step s12, the clock 204 measures the time-of-day local to the aircraft 102 at which the image was captured. The clock 204 then sends the time-of-day measurement to the processor 202.

At step s14, the IMU 206 measures the orientation of the aircraft 102 when the image was taken. In other words, the heading or facing of the aircraft 102 when the image was captured is measured. The IMU 206 then sends the orientation measurement to the processor 202. In some embodiments, the IMU 206 sends navigation data (including orientation measurements) to the processor 202 at a rate of 50 Hz.

In this embodiment, the camera 200 has a fixed facing relative to the aircraft 102. Thus, a measured orientation of the aircraft 102 at the point in time at which the image was captured by the camera 200 specify a direction in which that image was captured by the camera 200. In some embodiments, a camera mounted to a steerable turret may be used to capture image data, and measurements of the cameras facing may be taken.

At step s15, the processor 202 analyses the HSL-format image to determine a maximum luminance value $L_{max}$ in that image.

In this embodiment, maximum luminance value $L_{max}$ in an image is the maximum of the luminance (L) coordinate of all the pixels in that image.

At step s16, using the time-of-day measurement taken at step s12, and the aircraft orientation measurement taken at step s14, the processor 202 determines a luminance threshold value $L_T$. $L_T$ is less than $L_{max}$.

Use of the luminance threshold value $L_T$ is described in more detail later below.

In this embodiment, the $L_T$ is a function of the time-of-day measurement and the aircraft orientation measurement. In other embodiments, $L_T$ is a function of only one of the time-of-day measurement and the aircraft orientation measurement. In other embodiments, $L_T$ is a function of one or more further parameters instead of or in addition to one or both of the time-of-day measurement and the aircraft orientation measurement. For example, in some embodiments, $L_T$ is a function of a measurement of ambient light level in which the aircraft 102 is flying. In some embodiments, $L_T$ is a heuristic which may be learnt or based upon, for example, previous aircraft sorties and operations.

In some embodiments, determining the value of $L_T$ comprises looking up the $L_T$ value in a look-up table using the time-of-day measurement and/or the aircraft orientation measurement.

At step s18, using the time-of-day measurement taken at step s12, and the aircraft orientation measurement taken at step s14, the processor 202 determines a luminance interval value $L_{int}$.

Use of the luminance threshold value $L_T$ is described in more detail later below.

In this embodiment, the $L_{int}$ is a function of the time-of-day measurement and the aircraft orientation measurement. In other embodiments, $L_{int}$ is a function of only one of the time-of-day measurement and the aircraft orientation measurement. In other embodiments, $L_{int}$ is a function of one or more further parameters instead of or in addition to one or both of the time-of-day measurement and the aircraft orientation measurement. For example, in some embodiments, $L_{int}$ is a function of the computational power of the processor 202 available for performing the cloud detection process. In some embodiments, $L_{int}$ is a heuristic which may be learnt or based upon, for example, previous aircraft sorties and operations.

In some embodiments, determining the value of $L_{int}$ comprises looking up the $L_{int}$ value in a look-up table using the time-of-day measurement and/or the aircraft orientation measurement.

At step s20, the processor 202 segments the HSL-format image of the scene in-front of the aircraft 102 into separate regions using the determined maximum luminance value $L_{max}$, the luminance threshold value $L_T$, and the luminance interval value $L_{int}$.

In this embodiment, the segmentation of the image is performed as follows.

Firstly, an interval space between $L_{max}$ and $L_T$ is defined. The interval space comprises a plurality of intervals between $L_{max}$ and $L_T$, i.e.

$$[L_{max}, L_{max-1}], [L_{max-1}, L_{max-2}], \ldots, [L_{T+2}, L_{T+1}], [L_{T+1}, L_T],$$

where $[L_{i+1}, L_i]$ includes all luminance values less than or equal to $L_{i+1}$ and greater than $L_i$. In some embodiments, the interval $[L_{T+1}, L_T]$ includes all luminance values less than or equal to $L_{T+1}$ and greater than or equal to $L_T$.

In this embodiment, the size of each interval within the interval space is equal to $L_{int}$. In other words, for each interval $[L_{i+1}, L_i]$ in the interval space, $L_{i+1} - L_i = L_{int}$.

Secondly, each pixel in the HSL-format image is assigned to an interval in the interval space (or to a further interval $[L_T, 0]$ which contains all luminance values less than $L_T$ and greater than or equal to zero) depending upon its luminance coordinate value L. Thus, in effect, each pixel in the image is assigned a label.

Thirdly, adjacent pixels in the image that are assigned to the same interval in the interval space (i.e. have been assigned the same label), are grouped together to form image segments.

Thus, the HSL-format image is segmented into groups of pixels having similar luminance characteristics.

At step s22, the processor 202 classifies as "cloud" each segment in the image that contains pixels that have been assigned to an interval in the interval space between $L_{max}$ and $L_T$.

Also, the processor 202 classifies as "not a cloud" each segment in the image that contains pixels that have not been assigned to an interval in the interval space between $L_{max}$ and $L_T$, i.e. pixels that are assigned to $[L_T, 0]$. In this embodiment, the segments that contain pixels that have not been assigned to an interval in the interval space between $L_{max}$ and $L_T$ contain only those pixels that have a luminance value that is less than $L_T$. In some embodiments, the segments that contain pixels that have not been assigned to an interval in the interval space between $L_{max}$ and $L_T$ may be assigned a different label or be classified in a different way, for example, those segments may be classified as "sky" or "ground".

Figure 5:
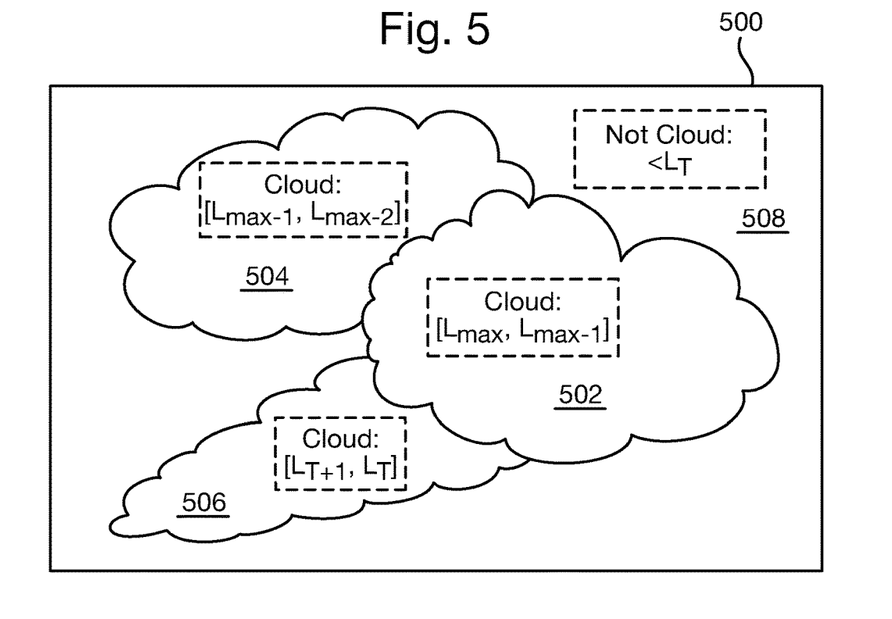
FIG. 5 is a schematic illustration (not to scale) showing a segmented image produced during the cloud detection process.

FIG. 5 is a schematic illustration (not to scale) showing the segmented image 500 produced by the processor 202 at step s22.

In this embodiment, the image 500 comprises a plurality of image segments, namely a first segment 502, a second segment 504, a third segment 506, and a fourth segment 508.

The first segment 502 comprises pixels that have been assigned to the interval $[L_{max}, L_{max-1}]$. As the pixels in the first segment 502 have been assigned to an interval in the interval space between $L_{max}$ and $L_T$, the first segment 502 is assigned the label "CLOUD". The "CLOUD" label and the $[L_{max}, L_{max-1}]$ interval that have been assigned to the first segment 502 are shown in FIG. 5, in a dotted box located in the first segment 502.

The second segment 504 comprises pixels that have been assigned to the interval $[L_{max-1}, L_{max-2}]$. As the pixels in the second segment 504 have been assigned to an interval in the interval space between $L_{max}$ and $L_T$, the second segment 504 is assigned the label "CLOUD". The "CLOUD" label and the $[L_{max-1}, L_{max-2}]$ interval that have been assigned to the second segment 504 are shown in FIG. 5, in a dotted box located in the second segment 504.

The third segment 506 comprises pixels that have been assigned to the interval $[L_{T+1}, L_T]$. As the pixels in the third segment 506 have been assigned to an interval in the interval space between $L_{max}$ and $L_T$, the third segment 506 is assigned the label "CLOUD". The "CLOUD" label and the $[L_{T+1}, L_T]$ interval that have been assigned to the third segment 506 are shown in FIG. 5, in a dotted box located in the third segment 506.

The fourth segment 508 comprises pixels that have a luminance coordinate value less than $L_T$. Thus, the pixels in the fourth segment 508 are not assigned to an interval in the interval space between $L_{max}$ and $L_T$, and so the fourth segment 508 is assigned the label "NOT CLOUD". The "NOT CLOUD" label that has been assigned to the fourth segment 508 is shown in FIG. 5, in a dotted box located in the fourth segment 508.

Thus, the processor 202 detects the presence of clouds in the images captured by the camera 200.

In some embodiments, the segments in the image that are classified as "CLOUD" may be further classified depending upon the luminance interval assigned to the pixels in that segment.

In some embodiments, one or more segment in the segmented image may be labelled as a particular type of cloud depending upon the luminance interval assigned to that segment. For example, a segment may be further classified as a stratus cloud, and assigned a "STRATUS" label by the processor 202, if it contains pixels assigned to any of the intervals $[L_i, L_{i+1}]$, $[L_{i+1}, L_{i+2}]$, or $[L_{i+2}, L_{i+3}]$.

In some embodiments, one or more segments in the segmented image may be labelled as having certain cloud characteristics or properties depending upon the luminance interval assigned to that segment. For example, a segment may be further classified as a cloud associated with an increased risk of aircraft icing, and assigned an "ICE RISK" label by the processor 202, if it contains pixels assigned to the interval $[L_j, L_{j+1}]$ or $[L_{j+1}, L_{j+2}]$. Also for example, a segment may be further classified as a cloud associated with an increased lightning strike risk, and assigned a "LIGHTNING RISK" label by the processor 202, if it contains pixels assigned to the intervals $[L_k, L_{k+1}]$.

Thus, the cloud detection process of step s2 is provided.

Figure 6:
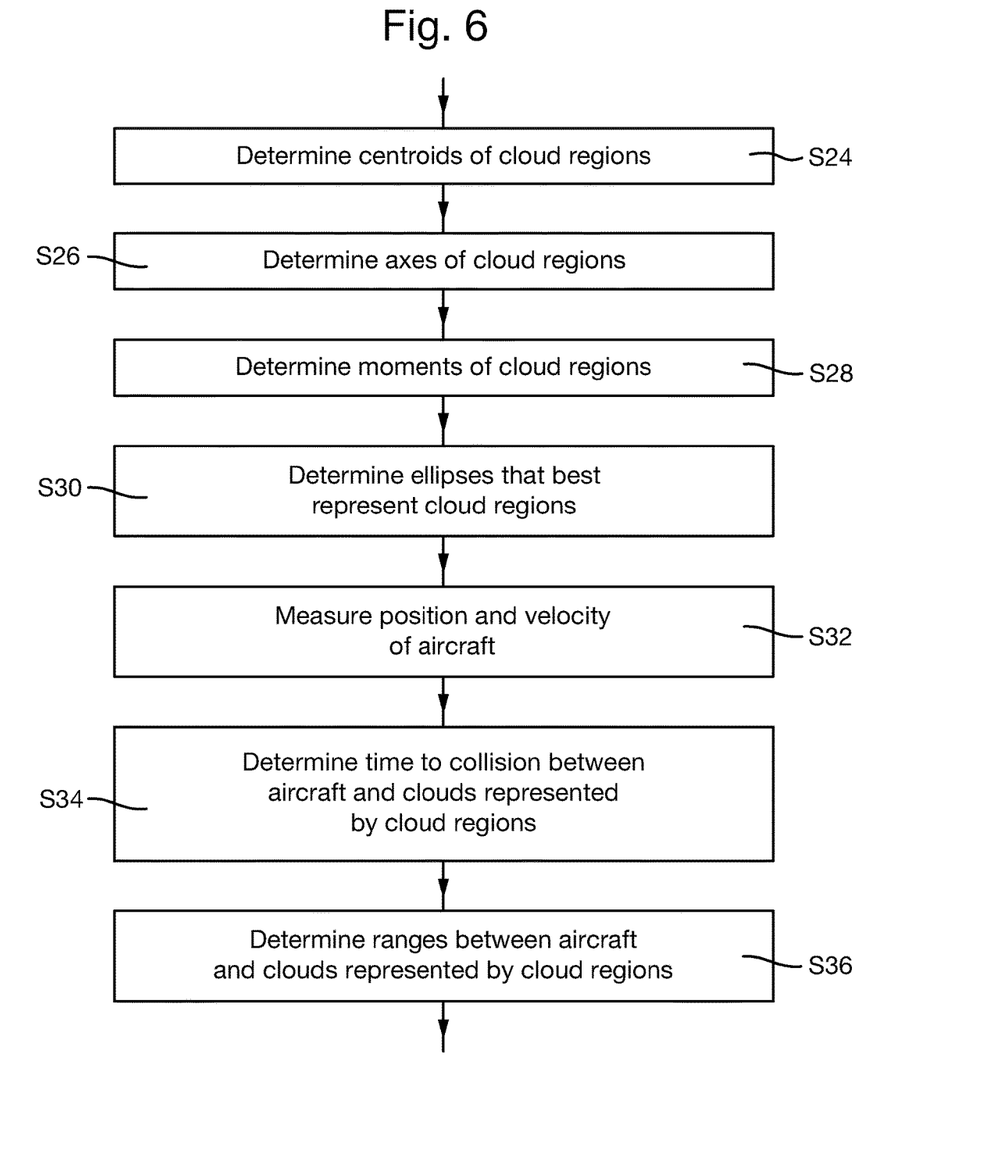
FIG. 6 is a process flow chart showing certain steps of a cloud ranging process.

Returning to the description of step s4, FIG. 6 is a process flow chart showing certain steps of an embodiment of the cloud ranging process for determining a range between the aircraft 102 and the clouds detected at step s2 (which correspond to the image segments 502, 504, 506). Although the cloud ranging process of FIG. 6 is described below as being performed based on the single image 500 captured by the camera 200, it will be appreciated by the skilled person that, in practice, the camera 200 captures a video or image sequence and that the process of FIG. 3 may be continuously performed or updated as new images are captured.

At step s24, for each segment of the image 500 that has been classified as "cloud", the processor 202 determines the centroid of that segment. Any appropriate centroid determination process may be used.

Thus, in this embodiment, the processor 202 determines a respective centroids for the first, second, and third image segments 502, 504, 506.

In this embodiment, the centroid, or geometric centre, of a two-dimensional image segment is the arithmetic mean ("average") position of all the pixels in that image segment.

At step s26, for each segment of the image 500 that has been classified as "cloud", the processor 202 determines the major and minor axes of that segment. Any appropriate axes determination process may be used. For example, in some embodiments, the covariance matrix of an image segment may be determined, and the eigenvectors of that covariance matrix determined. The eigenvalues of the covariance matrix of an image segment may correspond to the lengths of the major and minor axes of that image segment. The eigenvectors of the covariance matrix of an image segment may correspond to the orientations of the major and minor axes of that image segment.

Figure 7:
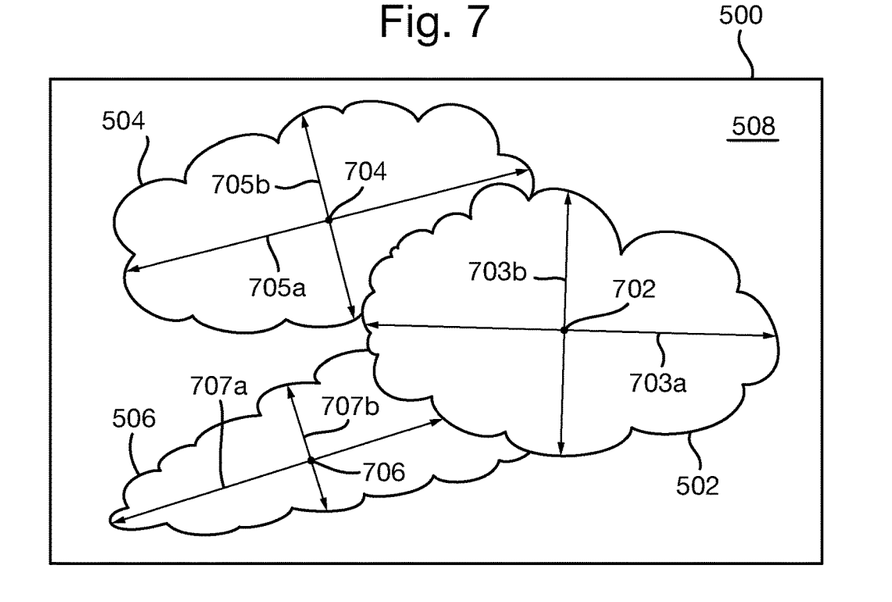
FIG. 7 is a schematic illustration (not to scale) illustrating an image produced during the cloud ranging process.

FIG. 7 is a schematic illustration (not to scale) illustrating the information determined by the processor 202 at step s26.

The first image segment 502 has previously been labelled as "CLOUD". Thus a centroid of the first image segment 502, which is hereinafter referred to as the "first centroid" and indicated in FIG. 7 by the reference numeral 702, has been determined. Also, major and minor axes of the first image segment 502, which are hereinafter referred to as the "first major axis" 703a and the "first minor axis" 703b, have also been determined.

The second image segment 504 has previously been labelled as "CLOUD". Thus a centroid of the second image segment 504, which is hereinafter referred to as the "second centroid" and indicated in FIG. 7 by the reference numeral 704, has been determined. Also, major and minor axes of the second image segment 504, which are hereinafter referred to as the "second major axis" 705a and the "second minor axis" 705b, have also been determined.

The third image segment 506 has previously been labelled as "CLOUD". Thus a centroid of the third image segment 506, which is hereinafter referred to as the "third centroid" and indicated in FIG. 7 by the reference numeral 706, has been determined. Also, major and minor axes of the third image segment 506, which are hereinafter referred to as the "third major axis" 707a and the "third minor axis" 705b, have also been determined.

The fourth image segment 508 is not labelled as "CLOUD". Thus, in this embodiment, a centroid and major/minor axes are not determined for this segment 508.

At step s28, for each segment of the image 500 that has been classified as "cloud", the processor 202 determines a plurality of image moments of that segment.

In this embodiment, a plurality of discrete versions of Cartesian moments are determined for each of the image segments that have been classified as "cloud". Preferably, discrete versions of at least the first four Cartesian moments, $I_1$, $I_2$, $I_3$, and $I_4$ are determined for each of the image segments that have been classified as "cloud". For example, the discrete versions of the first five Cartesian moments, $I_1$, $I_2$, $I_3$, $I_4$, and $I_5$ may be determined. In some embodiments, for one or more of the image segments, one or more different image moments instead of or in addition to the discrete versions of the Cartesian moments may be determined, for example, central moments. The first moment $I_1$ of an image segment may be a moment of inertia of that image segment.

At step s30, for each segment of the image 500 that has been classified as "cloud", using the centroid, the major and minor axes, and the image moments of that image segment, the processor 202 determines an ellipse that best represents that image segment.

In other words, in this embodiment, using the first centroid 702, the first major and minor axes 703a, 703b, and image moments of the first image segment 502, the processor determines a first ellipse that is representative of the first image segment 502. The processor 202 also determines a second ellipse that is representative of the second image segment 504 in the same way mutatis mutandis. The processor 202 also determines a third ellipse that is representative of the third image segment 506 in the same way mutatis mutandis.

Figure 8:
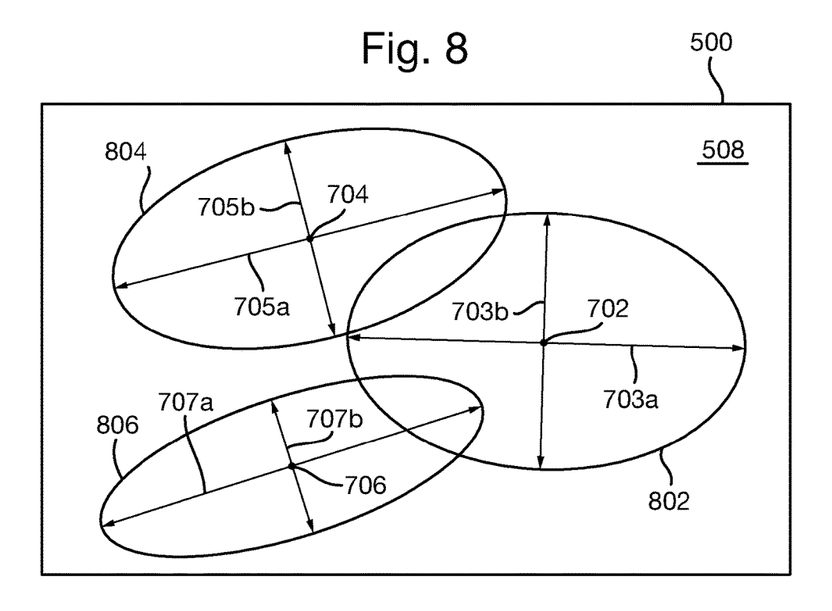
FIG. 8 is a schematic illustration (not to scale) illustrating an image produced during the cloud ranging process.

FIG. 8 is a schematic illustration (not to scale) illustrating the first ellipse 802, the second ellipse 804, and the third ellipse 806 that are representative of the first image segment 502, the second image segment 504, and the third image segment 506 respectively.

In this embodiment, any appropriate method of determining the ellipses 802, 804, 806 may be implemented.

The first centroid 702 is the centre of the first ellipse 802. The first major and minor axes 703a, 703b are the major and minor axes respectively of the first ellipse 802. Similarly, the second centroid 704 is the centre of the second ellipse 804, and the second major and minor axes 705a, 705b are the major and minor axes respectively of the second ellipse 804. Similarly, the third centroid 706 is the centre of the third ellipse 806, and the third major and minor axes 707a, 707b are the major and minor axes respectively of the third ellipse 806.

The ellipses 802, 804, 806 are geometric parametric models of the "cloud" image segment that are generated using the moments extracted from those image segments.

In this embodiment, the ellipses 802, 804, 806 are curvilinear models of the "cloud" image segments. Also, the ellipses are digital models representative of the "cloud" image segments. In other embodiments, different models of one or more of the image segments may be determined instead of or in addition to an ellipse. For example, in some embodiments, a different curvilinear geometric representation of an image segment, e.g. a circle or an oval, may be used. In some embodiments, a rectilinear geometric representation of an image segment, e.g. a polygonal representation, may be used. Preferably image segments are represented by geometric models or representations formed by, or characterized by, points, lines, curves, or surfaces. More preferably, the geometric representations of image segments are in the form of relatively simple geometric forms, such as circles, ellipses, rectangles, and triangles.

Advantageously, the ellipses 802, 804, 806 tend to be very stable representations of the cloud segments.

In some embodiments, the ellipses 802, 804, 806 are maximally stable external regions (MSER). Further information on MSER and the extraction/detection of MSER from images may be found, for example, in J. Matas, O. Chum, M. Urban, and T. Pajdla. "Robust wide baseline stereo from maximally stable external regions.", Proc. of British Machine Vision Conference, pages 384-396, 2002, which is incorporated herein by reference in its entirety.

Advantageously, as more images of the scene are captured and the image segmentation and the ellipses 802, 804, 806 are updated, the ellipses 802, 804, 806 tend to exhibit similar properties to each other and the clouds that they represent (e.g. motion due to wind etc.).

At step s32, the IMU 206 measures the position and velocity of the aircraft 102. The measurements of the aircraft's position and velocity taken by the IMU 206 are sent from the IMU 206 to the processor 202.

At step s34, using the measured position and velocity of the aircraft 102, for each of the determined ellipses 802, 804, 806, the processor 202 determines a "time-to-collision" between the aircraft 102 and the cloud represented by that ellipse 802, 804, 806.

To calculate the time to collision for an ellipse 802, 804, 806, the processor 202 may calculate the rate of change of the size of that ellipse in the image 500, and use the aircraft's position and velocity.

In some embodiments, the processor 202 assumes that the ellipses (i.e. the clouds) are stationary, and that only the aircraft 102 is moving. However, in other embodiments, a velocity of a cloud/ellipse may be calculated, for example, using measurements of the wind speed and direction relative to the aircraft 102, which may be taken by one or more appropriate sensors mounted on the aircraft 102.

At step s36, for each of the ellipses 802, 804, 806, using the "time-to-collision" determined for that ellipse 802, 804, 806, the processor 202 determines a range between the aircraft 102 and the cloud represented by that ellipse 802, 804, 806. Measurements of the velocity of the aircraft 102 may be used to determine the cloud ranges.

In some embodiments, the major and minor axes of an ellipse may be converted into azimuth and elevation coordinates, for example, from an origin located at a current position of the aircraft 102. Cloud ranges and angular extents from the point of view of the aircraft 102 may be in the form of azimuth, elevation, and range coordinates.

Thus, the cloud ranging process of step s4 is provided.

Returning to the description of step s6 of FIG. 3, control signal for controlling the aircraft 102 may be determined using the azimuth, elevation, and range properties of the detected clouds. The aircraft 102 may be controlled so as to avoid the detected clouds. In some embodiments, only those clouds having been assigned certain labels are avoided, for example, in some embodiments, only clouds having been labelled as ICE RISK or LIGHTNING RISK are actively avoided.

Using the above described cloud detection process, different cloud structures within a region of cloud may be detected. Thus, different parts of a cloud formation having different properties and characteristics may be detected. Thus, it tends to be possible to differentiate areas of cloud that may be hazardous to the aircraft from those that are relatively safe, and the aircraft may be controlled accordingly. Thus, the above described method and apparatus tends to reduce or eliminate the unnecessary avoidance of cloud.

Advantageously, the parametric representations of the clouds used in the above described cloud ranging process tend to be stable, i.e. unchanging over time. Thus, the cloud ranging process tends to be advantageously robust.

Advantageously, the above described method allows for the autonomous operation of an aircraft. In particular, the autonomous navigation of an aircraft through or within the vicinity of a cloud formation is facilitated. The aircraft may avoid at least the most hazardous regions of cloud.

The above described cloud detection and cloud ranging processes tend to be relatively simple and relatively computationally inexpensive to perform compared to conventional cloud detection/ranging techniques.

The appearance of clouds (e.g. the colours of the clouds) tends to change depending on, for example, the time of day, the time of year, and the weather. For example, clouds and the sky tend to appear redder at dawn and dusk. Advantageously, the above described method tends to be robust to such changes in the colours of clouds. This may, for example, be as a result of performing image segmentation based on luminance measurements, as opposed to on a colour basis as is typically used in conventional cloud detection/ranging processes in which images tend to be in the RGB format.

Obtaining range information to cloud features tends to be difficult, for example, due to cloud motion and the typically small triangulation baseline. The above described methods advantageously tend to traverse these difficulties.

Apparatus, including the processor 202, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 3, 4, and 6 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the aircraft is an unmanned autonomous aircraft. However, in other embodiments, the aircraft is a manned aircraft. Also, in some embodiments, the aircraft may be a semi-autonomous aircraft or controlled by a human pilot (e.g. a human located at a ground-base). In embodiments in which the aircraft is controlled by a navigator or pilot, a display device can be used to display the detected clouds and/or range information to help the navigator or pilot fly the aircraft. For example, a display may be produced that shows the images of any of FIGS. 5, 7, and/or 8 providing information regarding the positions of detected clouds.

In the above embodiments, the cloud detection and cloud ranging processes run in an on-line to navigate the aircraft. However, in other embodiments, systems may run in off-line modes. In some off-line embodiments, the processor may receive input from a data source in the form of a video and navigation logfile.

In the above embodiments, aircraft position, orientation, and velocity measurements are provided by the IMU to the processor for use in the cloud detection and ranging processes. In some embodiments, other data instead of or in addition to the aircraft position, orientation, and/or velocity measurements may be used by the processor. Examples of such data include but are not limited to latitude, longitude, altitude, pan, tilt, roll and rates data. Such data may be provided to the processor by the IMU or a different system on-board or remote from the aircraft.

In the above embodiment, the cloud detection and ranging process is used to navigate an aircraft. However, in other embodiments, the cloud detection process and/or the cloud ranging process may be used for a different appropriate purpose, for example, an output of the detection process and/or the cloud ranging process may be transmitted from the aircraft to an entity remote from the aircraft for the purpose of, e.g., navigating one or more further aircraft or forecasting weather.

In the above embodiments, ranges between the detected clouds and the aircraft are determined using the cloud ranging process described above with reference to FIG. 6. However, in other embodiments, a different appropriate cloud ranging process is used.

The invention claimed is:

1. A method of detecting cloud features, the method comprising:
    obtaining image data, with one or more cameras, an image, said the image data defining a plurality of pixels and, for each pixel, a respective luminance value;
    measuring an orientation of the camera when the image was captured; and
    determining the threshold luminance value ($L_T$) using the measured orientation
    defining one or more intervals for the luminance values of the pixels;
    partitioning the image data into one or more image segments, each respective image segment-containing pixels having a luminance value in a respective interval; and
    classifying, as a cloud feature, each image segment-containing pixels having luminance value greater than or equal to said threshold luminance value ($L_T$).

2. The method according to claim 1, wherein
    obtaining the image data comprises capturing, using one or more cameras, an image; and
    the method further comprises:
        measuring a time of day at which the camera-captured the image; and
        determining the threshold luminance value ($L_T$) using the measured time of day.

3. The method according to claim 1, wherein the step of obtaining image data comprises converting image data into a hue-saturation-luminance coordinate system.

4. The method according to claim 1, the method further comprising classifying, as an entity other than a cloud feature, each image segment containing pixels having luminance values less than the threshold luminance value ($L_T$).

5. The method according to claim 1, wherein the step of defining one or more intervals for the luminance values of the pixels comprises:
    determining a maximum of the luminance values of the pixels ($L_{max}$);
    obtaining the threshold luminance value ($L_T$), the threshold luminance value ($L_T$) being less than the maximum of the luminance values ($L_{max}$); and
    defining one or more intervals between the maximum of the luminance values ($L_{max}$) and the threshold luminance value ($L_T$).

6. The method according to claim 1, wherein a size or sizes of the one or more intervals is/are determined using one or more measurements selected from the group of measurements consisting of: a time of day measurement, an orientation measurement, and a measurement of available computational resource.

7. The method according to claim 1, wherein
    the step of classifying comprises:
        for a first image segment classified as a cloud feature, assigning a first set of classification labels, the first image segment containing pixels having luminance values in a first interval;
        for a second image segment classified as a cloud feature, assigning a second set of classification labels, the second image segment containing pixels having luminance values in a second interval, the second interval being different to the first interval, the second set of classification labels being different to the first set of classification labels.

8. The method according to claim 7, wherein:
    the first set of classification labels includes a label indicating a first type of cloud;
    the second set of classification labels includes a label indicating a second type of cloud, the second type of cloud being different to the first type of cloud.

9. The method according to claim 1, the method further comprising, for an image segment classified as a cloud feature:
    determining a plurality of moments of that image segment;
    using the determined plurality of moments, determining a geometric representation of that image segment; and using the geometric representation of that image segment, determining a distance between the cloud feature represented by that image segment and an entity that obtained the image data.

10. The method according to claim 1, wherein:
obtaining the image data comprises capturing, using one or more camera, an image-;
the camera is mounted on an aircraft; and
the method further comprises, controlling the aircraft based on the detected cloud features.

11. An apparatus for detecting cloud features, the apparatus comprising:
one or more sensors-configured to obtain image data, the image data defining a plurality of pixels and, for each pixel, a respective luminance value;
one or more processors configured to:
measure an orientation of the sensors when the image data was captured; and
determine a threshold luminance value ($L_T$) using the measured orientation;
define one or more intervals for the luminance values of the pixels;
partition the image data into one or more image segments, each respective image segment containing pixels having a luminance value in a respective interval; and
classify, as a cloud feature, each image segment containing pixels having luminance value greater than or equal to said threshold luminance value ($L_T$).

12. A non-transitory computer readable medium wherein is stored a program or plurality of programs arranged such that when executed by a computer system or one or more processors said program or said plurality of cause the computer system or the one or more processors to operate in accordance with the method of claim 1.

13. An aircraft comprising the non-transitory computer readable medium according to claim 12.

* * * * *